United States Patent
Sung et al.

(10) Patent No.: US 7,706,621 B2
(45) Date of Patent: Apr. 27, 2010

(54) METHOD AND AN APPARATUS TO DIVIDE IMAGE BLOCKS

(75) Inventors: Jun-ho Sung, Seoul (KR); Jae-seok Kim, Goyang-si (KR); Seong-joo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 996 days.

(21) Appl. No.: 10/769,777

(22) Filed: Feb. 3, 2004

(65) Prior Publication Data
US 2004/0165765 A1    Aug. 26, 2004

(30) Foreign Application Priority Data
Feb. 5, 2003    (KR) .................. 10-2003-0007118

(51) Int. Cl.
*G06K 9/46* (2006.01)
(52) U.S. Cl. .................. 382/236; 382/240
(58) Field of Classification Search .................. 382/236, 382/240
See application file for complete search history.

(56) References Cited

U.S. PATENT DOCUMENTS

| | | | | |
|---|---|---|---|---|
| 4,785,349 A | * | 11/1988 | Keith et al. ............ | 375/240.23 |
| 5,208,673 A | * | 5/1993 | Boyce .................... | 348/701 |
| 5,724,451 A | * | 3/1998 | Shin et al. .............. | 382/240 |
| 5,923,376 A | * | 7/1999 | Pullen et al. ........... | 375/240.16 |
| 6,304,606 B1 | * | 10/2001 | Murashita et al. ...... | 375/240.24 |
| 6,529,634 B1 | * | 3/2003 | Thyagarajan et al. .. | 382/239 |

FOREIGN PATENT DOCUMENTS

KR    1996-13055    4/1996

OTHER PUBLICATIONS

Efficient Multiview Image Compression Using Quadtree Disparity Estimation D.R. Clewer, L.J. Luo, C.N. Canagarajah, D.R. Bull, M.H. Barton (IEEE, V295-298).
Robust Quadtree-based disparity estimation for the reconstruction of intermediate stereoscopic images (Anthony Mancini and Janusz Konrad) IS&T SPIE Symposium on Electronic Imaging Stereoscopic Displays and Virtual Reality Syst. Jan. 24-30, 1998, San Jose, CA.

* cited by examiner

*Primary Examiner*—Vikkram Bali
*Assistant Examiner*—Katrina Fujita
(74) *Attorney, Agent, or Firm*—Stanzione & Kim LLP (57) ABSTRACT

A method and an apparatus to divide image blocks to improve the quality of intermediate images by splitting each macro image block (macro block) in left-eye and right-eye views into sub image blocks (sub blocks) according to quadtree disparity estimation, and then splitting each sub block into smaller sub blocks. The method includes setting a plurality of splitting threshold values for a macro block in an image frame and determining whether to split the macro block into sub blocks, and setting a plurality of splitting threshold values for each sub block and determining whether to split each sub block into smaller sub blocks.

36 Claims, 8 Drawing Sheets

METHOD AND AN APPARATUS TO DIVIDE IMAGE BLOCKS

CROSS-REFERENCE TO RELATED APPLICATIONS

This application claims priority from Korean Patent Application No. 2003-07118, filed Feb. 5, 2003, the contents of which are incorporated herein in their entirety by reference.

BACKGROUND OF THE INVENTION

1. Field of the Invention

The present invention relates to a method and apparatus to divide image blocks, and more particularly, to a method and apparatus to improve the quality of intermediate images. To achieve such improvements, this invention proposes a new standard to divide image blocks that can prevent flickering in synthesized intermediate images when splitting image blocks using quadtree disparity estimation. The image block splitting is followed by disparity estimation required for synthesis of intermediate views used to represent a three dimensional (3D) image.

2. Description of the Related Art

To realize an imaging and communication system that provides a high degree of realism and naturalness, it is necessary to develop 3D image processing technology that can naturally represent images according to human visual characteristics. 3D image processing employs binocular parallax, which is a difference in depth of an object perceived by left and right eyes. Processing and transmission of binocular images is of great concern in the field of next generation visual communication.

However, one significant problem associated with such image processing and transmission is a large amount of information contained in stereoscopic images, considering the fact that most images are color or moving images as well as transmission rate over a transmission line and processing rate of a transmission (or image processing) system. To overcome this problem, it is necessary to research a technique to efficiently and easily compress a large amount of information while maintaining the quality of a stereoscopic image.

Research is being conducted to develop a method that involves estimating variation in objects within an image using the fact that left and right views have high correlation, instead of independently encoding the two views, transmitting the variation information and either the left or right view, and compensating and restoring the transmitted view to binocular images at a receiving terminal.

Further, when the viewpoint of an observer moves or there are several observers, multi-view images are needed to create a natural stereoscopic image. However, since independent transmission of all multi-view images excessively increases the amount of information, reconstruction of multi-view images from binocular images restored at the receiving terminal of a binocular image transmission system, often called intermediate view reconstruction (IVR) or intermediate view synthesis, is used. In this case, reconstruction can be performed using intermediate view interpolation or extrapolation by obtaining variation information related to intermediate views from information on variation between the binocular images.

3D images are compressed and decompressed using an MPEG technique applied to two dimensional (2D) images. In particular, compression, transmission, and decompression of 3D images for digital broadcasting are performed using MPEG-2, which is a standard for digital broadcasting.

As is widely known in the art, MPEG-2 uses block-based compression schemes to compress 2D images. Currently, these schemes are also applied to compression of 3D images and are known as the most efficient method of 3D image compression.

Block-based compression is performed in blocks of a fixed size (for example, 16×16 pixels), each of which is called a macro block. Compression is achieved by motion estimation in units of a macro block and calculating a motion vector, which is the resulting value of estimation, and prediction error. When macro blocks of a fixed size are used in synthesizing intermediate views from binocular images, as in 2D images for stereoscopic depth perception by a viewer of 3D images as mentioned above, degradation in the quality of intermediate views may occur. In particular, quality degradation due to blurring of the edges of an image becomes a significant problem.

To overcome this problem, various quadtree disparity estimation approaches that can prevent quality degradation by splitting a macro block of a fixed size into smaller sub blocks near the edge of an image have been proposed (1998 SPIE Paper: Anthony Mancini and Janusz Konrad, "Robust Quadtree-based Disparity Estimation for the Reconstruction of Intermediate Stereoscopic Images", and IEEE 0-7803-6685-9/01 Paper: D. R. Clewer, "Efficient Multiview Image Compression Using Quadtree Disparity Estimation").

According to a quadtree disparity estimation approach, a block matching technique is used to calculate a mean absolute difference (MAD) of each macro block in left-eye and right-eye views and MADs of four sub blocks into which the macro block is divided. Then, if a ratio $R_{madsub1}$ of the maximum sub block MAD to the minimum sub block MAD within a macro block is less than a predetermined threshold, disparity between binocular images is estimated in units of macro blocks. Conversely, if $R_{madsub1}$ is greater than the threshold, disparity is re-estimated for each sub block. Since a method of calculating MADs is described in detail in literature including the above-cited references, a detailed description will be omitted.

Figure 1A:
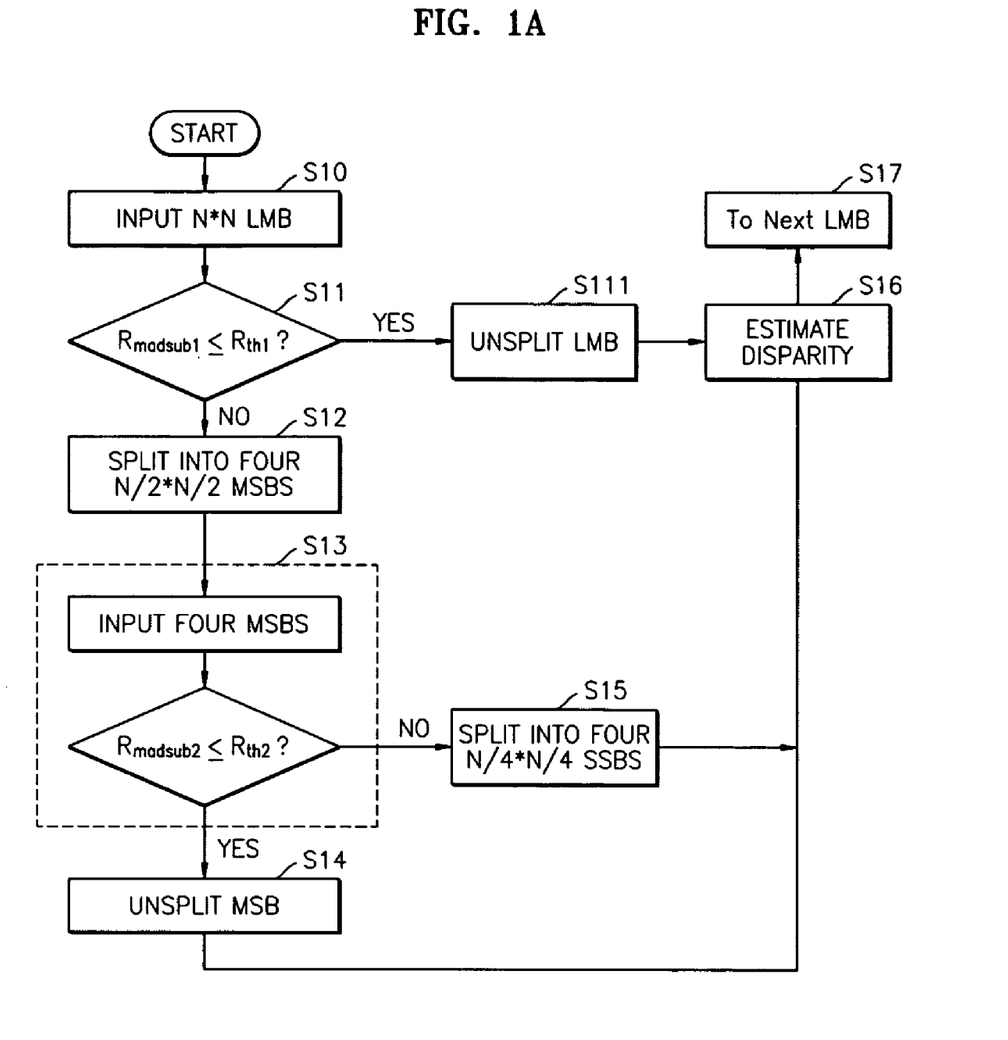
FIG. 1A is a flowchart showing a conventional image block splitting method.

FIG. 1A shows a conventional block splitting algorithm using quadtree disparity estimation. As mentioned above, a quadtree disparity estimation approach involves splitting an N×N macro block into four (N/2)×(N/2) sub blocks and estimating disparity in units of sub blocks when the ratio of the maximum sub block MAD to the minimum sub block MAD within the macro block is greater than a predetermined threshold. The conventional block splitting process using the quadtree disparity estimation approach will now be described in detail with reference to FIG. 1A.

If an N×N macro block that is the highest level block in disparity estimation (hereinafter called "Large Macro block (LMB)") is input (operation S10), block matching between binocular images is implemented to estimate disparity between the binocular images and verifies if the resulting estimate is correct. The adequacy and correctness of estimation is determined by $R_{madsub1}$, which denotes the ratio of the maximum MAD of any sub block (lower level block) within a macro block (higher level block) to the minimum MAD of any sub block within the same macro block. As $R_{madsub1}$ becomes greater, the disparity difference between regions in a block becomes greater, and thus this estimation becomes less accurate. If the resulting estimate is verified as the most ideal one, which means there is little disparity difference between regions within the block, $R_{madsub1}$ approximates 1, which is the minimum value.

Next, in operation S11, it is determined whether to split the LMB. This is done by determining whether $R_{madsub1}$ is greater than a first threshold value $R_{th1}$, which is the reference value used to judge whether to split the LMB. $R_{th1}$ is decided by experiment.

If $R_{madsub1}$ is less than $R_{th1}$, which means disparity present between binocular images is low, LMB is not split (operation S111) and disparity is estimated in units of LMBs (operation S16). Then, in operation S17 it is decided whether to split the next LMB.

If $R_{madsub1}$ is greater than $R_{th1}$, the LMB is split into four (N/2)×(N/2) sub blocks (hereinafter called "Middle Sub Blocks (MSBs)") (operation S12), and it is determined whether to split each MSB (operation S13). For this determination, the MAD of each (N/4)×(N/4) sub block (hereinafter called "Small Sub Block (SSB)") within an MSB is calculated. Then, $R_{madsub2}$, the ratio of the maximum SSB MAD to the minimum SSB MAD within an MSB, is calculated and compared to a second threshold value $R_{th2}$, which is a reference value to determine whether to split the MSB. Like $R_{th1}$, $R_{th2}$ is decided by experiment.

If $R_{madsub2}$ is less than $R_{th2}$, the MSB is not split (operation S14) and disparity is estimated in units of MSBs (operation S16). Then, in step S17 it is determined whether to split the next LMB.

If $R_{madsub2}$ is greater than $R_{th2}$, the MSB is split into four (N/4)×(N/4) SSBs (operation S15). Then, in operation S17 it is determined whether to split the next LMB.

Figure 1B:
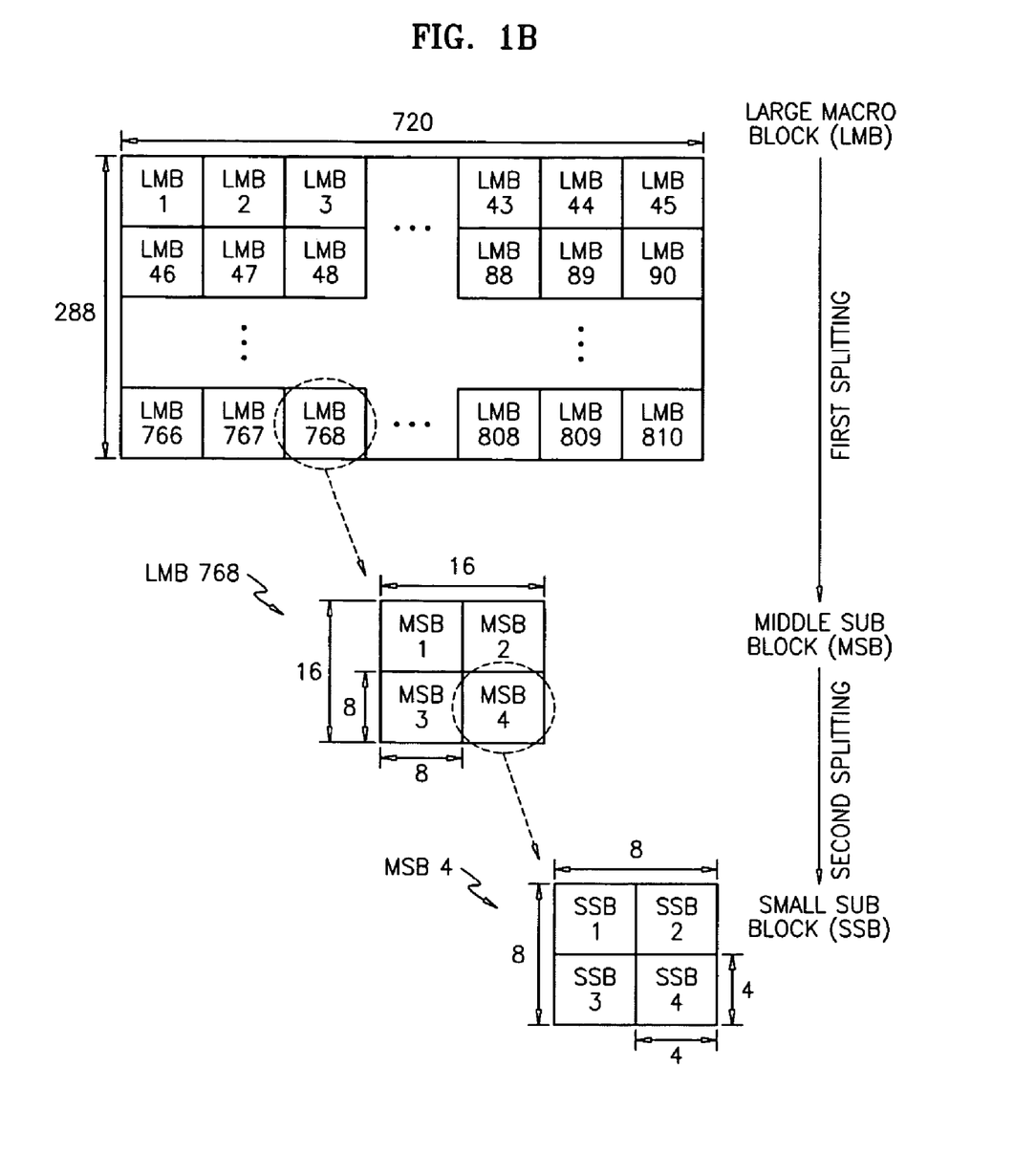
FIG. 1B shows image blocks produced in a block splitting procedure according to a quadtree disparity estimation approach.

FIG. 1B shows image blocks produced in a block splitting procedure using a quadtree disparity estimation approach. Each block is contained in a 720×288 image frame. A block splitting technique proposed by the present invention is applied to the image blocks shown in FIG. 1B. For an image created by interlaced scanning, in particular, this splitting may be performed in frames or fields. As mentioned above, the conventional block splitting algorithm splits a higher level block into four lower level blocks in order to re-estimate disparity when the maximum to minimum MAD ratio of the lower level blocks exceeds a single threshold, thus obtaining more detailed intermediate views.

However, a little change can occur in disparity due to shaking of the camera, changes in lighting conditions, and noise components such as dust, even in a still image or low complexity image (with less motion). Since blocks in this kind of image may have MAD ratios near a threshold, the determination of whether these blocks are split is highly dependant on such changes in disparity. Thus, disparity estimates suffer from a significant change when synthesizing intermediate views for such an image block. In this case, since the conventional block splitting algorithm applies each single threshold when splitting an LMB into four MSBs and an MSB into four SSBs, flickering can occur in synthesized intermediate views.

Furthermore, the conventional block splitting algorithm in the quadtree disparity estimation approach cannot prevent degradation in quality of intermediate views, in particular, flickering near edges, by adopting a single threshold.

SUMMARY OF THE INVENTION

The present invention provides a method and apparatus to prevent flickering when synthesizing intermediate views that are required to represent a three dimensional (3D) image.

Accordingly, it is an aspect of the present invention to provide a new method of splitting a macro image block (higher level block) into sub blocks (lower level blocks) according to a quadtree disparity estimation approach.

It is another aspect of the present invention to provide a new apparatus to split a macro image block (higher level block) into sub blocks (lower level blocks) according to a quadtree disparity estimation approach.

Additional aspects and/or advantages of the invention will be set forth in part in the description which follows and, in part, will be obvious from the description, or may be learned by practice of the invention.

The foregoing and/or other aspects of the present invention are achieved by providing a method of splitting each of macro image blocks (hereinafter called "macro blocks") in left-eye and right-eye views into sub image blocks ("sub blocks") according to quadtree disparity estimation, and then splitting each sub block into smaller sub blocks. The method includes: setting a plurality of splitting threshold values for a macro block in an image frame and determining whether to split the macro block into the sub blocks; and setting a plurality of splitting threshold values for each sub block and determining whether to split each sub block into smaller sub blocks.

The foregoing and/or other aspects of the present invention may also be achieved by providing a method of splitting an image block the method comprising: setting a plurality of macro block splitting threshold values to split a macro block in an image frame into sub blocks and determining whether to split the macro block according to whether a macro block at the same location in a preceding image frame as the current macro block (hereinafter called "preceding macro block") has been split; and setting a plurality of sub block splitting threshold value for splitting the sub block into smaller sub blocks and determining whether to split each sub block into smaller sub blocks according to whether a sub block at the same location in the preceding macro block as the current sub block (hereinafter called "preceding sub block") has been split.

The foregoing and/or other aspects of the present invention may also be achieved by providing an apparatus to split an image block, the apparatus comprising: a macro block splitting determining unit that sets a plurality of macro block splitting threshold values to split a macro block in an image frame into sub blocks and determines whether to split the macro block; and a sub block splitting determining unit that sets a plurality of sub block splitting threshold values to split each sub block into smaller sub blocks and determines whether to split each sub block.

The foregoing and/or other aspects of the present invention may also be achieved by providing an apparatus to split an image block, the apparatus comprising: a macro block splitting determining unit that sets a plurality of macro block splitting threshold values to split a macro block in an image frame into sub blocks and determines whether to split the macro block according to whether a macro block at the same location in a preceding image frame as the current macro block (hereinafter called "preceding macro block") has been split; and a sub block splitting determining unit that sets a plurality of sub block splitting threshold values to split each sub block into smaller sub blocks and determines whether to split each sub block according to whether a sub block at the same location in a preceding macro block as the current sub block (hereinafter called "preceding sub block") has been split.

The foregoing and/or other aspects of the present invention may also be achieved by providing a recording medium on which a method is written as a program code that can be read and executed on a computer, the program coded method comprising: setting a plurality of splitting threshold value for a macro block in an image frame and determining whether to split the macro block into sub blocks; and setting a plurality of splitting threshold value for each sub block and determining whether to split each sub block into smaller sub blocks.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2A:
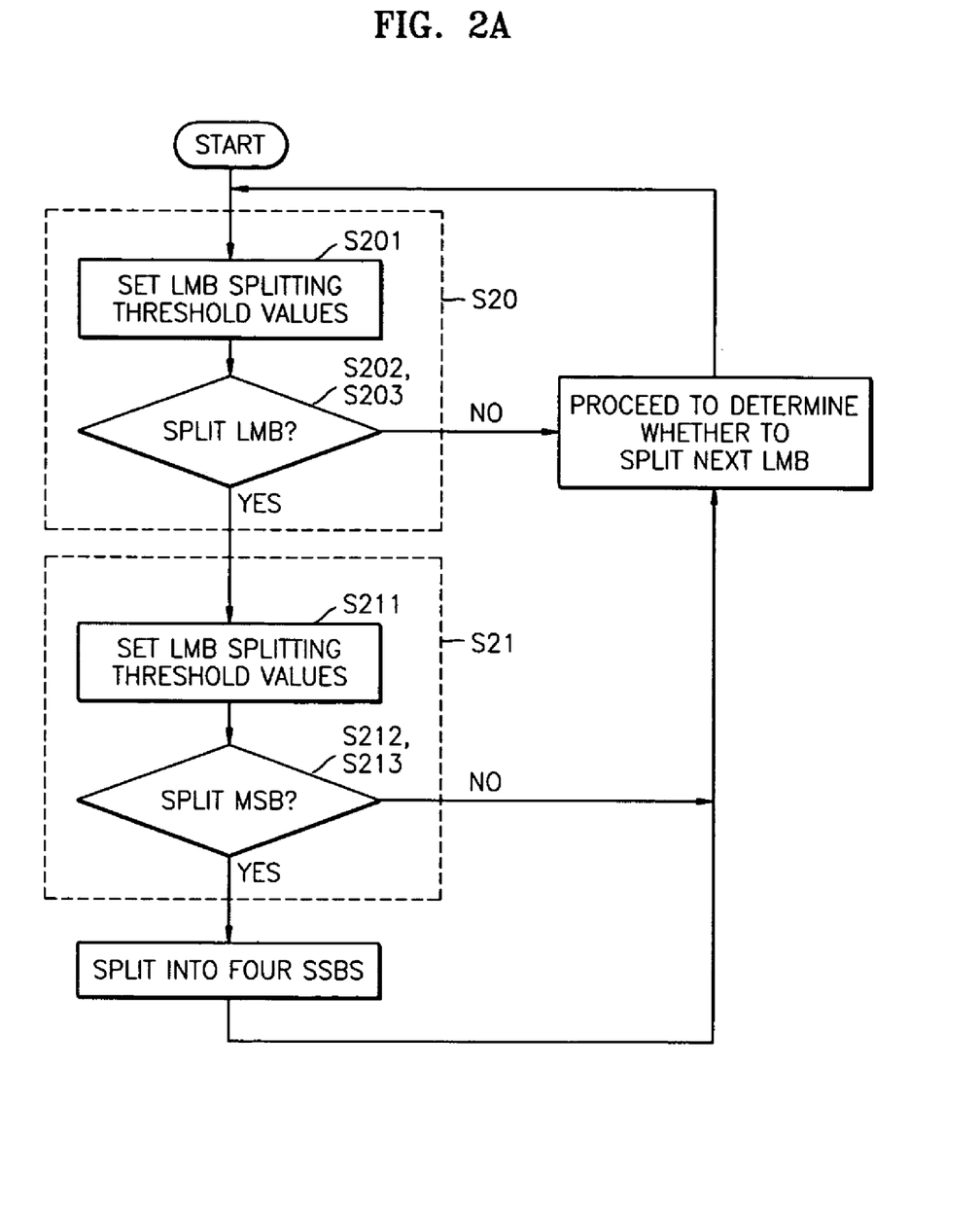
FIG. 2A is a flowchart showing a block splitting method according to an embodiment of the present invention.
Figure 2B:
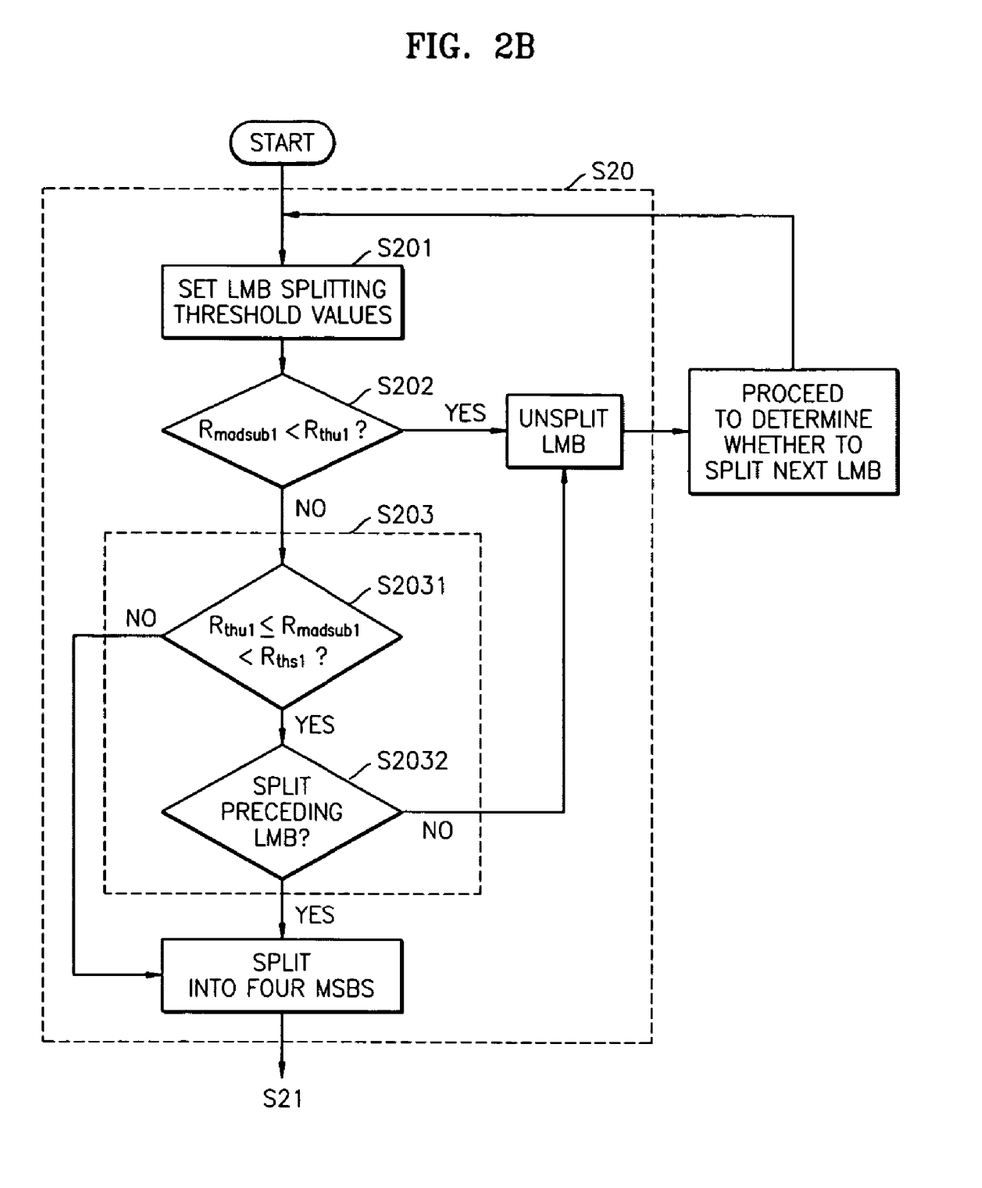
FIG. 2B is a flowchart showing operation S20 of the method of FIG. 2A according to another embodiment of the present invention.
Figure 2C:
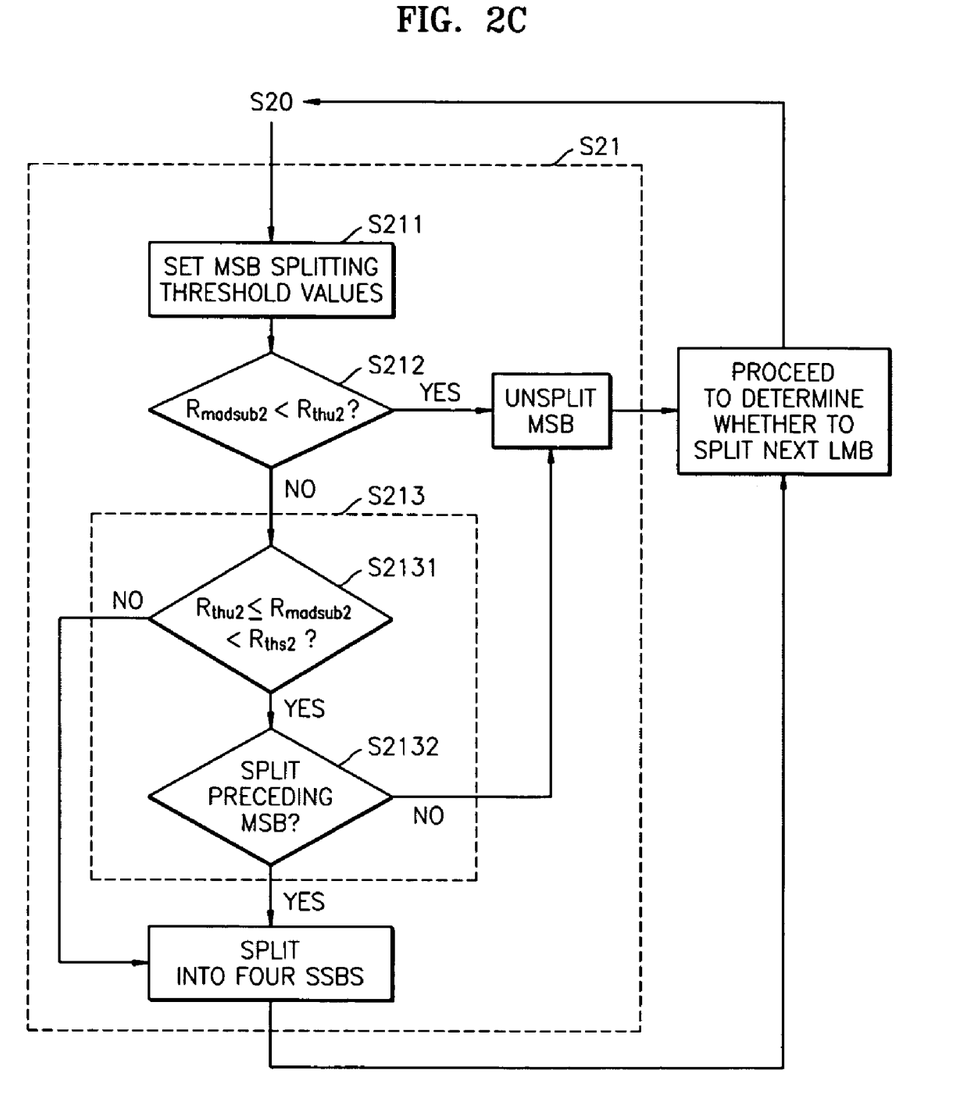
FIG. 2C is a flowchart showing operation S21 of the method of FIG. 2A according to another embodiment of the present invention.

Referring to FIGS. 2A-2C, in operation S20, a plurality of splitting threshold values are set for a first N×N large macro block (LMB) to be processed, and then splitting is determined depending on the set splitting thresholds. Hereinafter, to aid in understanding, it is assumed that N is 16 (generally, a macro block size is 16×16 or 8×8).

In operation S201, splitting threshold values are set for a 16×16 LMB by experiment. It is an aspect of the present invention to set two threshold values; a threshold value $R_{thu1}$ to determine the possibility of splitting the LMB, and a threshold value $R_{ths1}$ to determine whether to split the LMB. Since block splitting is performed to ensure the accuracy of estimation, the threshold values are preferably set based on mean absolute difference (MAD) ratios used in disparity estimation as described above. In this invention, MAD ratios calculated when splitting LMBs into MSBs and when splitting MSBs into SSBs are denoted by $R_{madsub1}$ and $R_{madsub2}$, respectively.

Here, it is an aspect to determine whether to split the 16×16 LMB (operation S20) by referring to whether the preceding 16×16 LMB has been split.

It is another aspect to determine whether to split the LMB by using only the above threshold values without referring to the result of processing the preceding 16×16 LMB. For example, while an LMB is not split if $R_{madsub1}$ approximates $R_{thu1}$, the LMB may be split if $R_{madsub1}$ approximates $R_{ths1}$. That is, whether to split the LMB can be determined by setting a predetermined reference value for $R_{madsub1}$.

Nevertheless, it is necessary to refer to splitting of the preceding 16×16 LMB due to ambiguity in the setting of the predetermined reference values and information about frames (blocks) in image data being similar. Thus, the image data may have hysteresis characteristics according to which processing of the current frame (block) is affected by the result of processing of the preceding frame (block). This invention determines whether to split an LMB to be processed using these characteristics of image data. The importance and reason for referring to splitting of the preceding LMB will be more clearly described infra.

Operation S20 is divided into operations S202 and S203. In operation S202, whether or not to split the LMB is determined by deciding whether $R_{madsub1}$ is greater than $R_{thu1}$. Here, $R_{madsub1}$ denotes the ratio of maximum MAD to minimum MAD of an 8×8 MSB within the 16×16 LMB. If $R_{madsub1}$ is greater than $R_{thu1}$, in operation 203, $R_{madsub1}$, $R_{thu1}$, and $R_{ths1}$ are compared with one another to determine whether to split the LMB.

After the threshold values $R_{thu1}$ and $R_{ths1}$ of the LMB are set in the operation S201, the operation S202 is performed to determine if $R_{madsub1}$ is less than $R_{thu1}$. If $R_{madsub1}$ is less than $R_{thu1}$, which means that disparity has been correctly estimated (there is no possibility of splitting the LMB), it is finally decided not to split the LMB.

Conversely, if $R_{madsub1}$ is greater than $R_{thu1}$ in the operation S202, which means there is a possibility of splitting the LMB, operation S203 is performed to determine whether to split the LMB. Unlike conventional techniques, the present invention does not directly target the LMB for splitting even when it is determined that there is no possibility of splitting it. Instead, the present invention further includes the operation S203 of determining whether to split the LMB.

When determining whether to split the LMB in the operation S203, first, it is determined in operation S2031 whether $R_{madsub1}$ is between $R_{thu1}$ and $R_{ths1}$, which is the threshold value to determine whether to split the LMB. If $R_{madsub1}$ is not between $R_{thu1}$ and $R_{ths1}$, which means $R_{madsub1}$ is greater than $R_{ths1}$, it is determined to split the LMB and the LMB is split into MSBs. Then, the process proceeds to operation S21 of determining whether to split the MSBs.

If $R_{madsub1}$ is between $R_{thu1}$ and $R_{ths1}$, which means that the LMB will be split or there is a possibility of splitting the LMB, to ensure accuracy in determination of the splitting possibility, the present invention further includes operation S2032 of determining whether an LMB placed at the same location in the preceding image frame as the LMB to be processed (hereinafter called "preceding LMB") has been split. Thus, the LMB to be processed is split, or whether to split the LMB is determined by referring to whether the preceding LMB has been split.

As described supra, the reason for referring to whether the preceding LMB has been split becomes evident through operation S203. In particular, it is necessary to refer to splitting of the preceding LMB when the determination of whether to split the current LMB is ambiguous. That is, if $R_{madsub1}$ is between $R_{thu1}$ and $R_{ths1}$, a minute change in disparity may occur, as described in the conventional technique. In such an image block, since the MAD ratio is near the splitting threshold, there is often ambiguity as to whether to split. If intermediate views are synthesized by unconditionally either splitting or not splitting the image block, the intermediate views may exhibit flickering. Thus, the present invention assures accuracy in the determination of whether to split by referring to whether the preceding LMB has been split.

When $R_{madsub1}$ is between $R_{thu1}$ and $R_{ths1}$ and it is ambiguous whether to split the current LMB, it is determined that the current LMB is to be split if the preceding LMB is found to have been split. If the preceding LMB has not been split, it is determined that the current LMB is not to be split. When $R_{madsub1}$ is between $R_{thu1}$ and $R_{ths1}$ and the current LMB is split without referring to whether the preceding LMB has been split, unnecessary splitting may degrade the quality of intermediate views synthesized after splitting. Thus, unnecessary splitting can be prevented by referring to whether the preceding LMB has been split.

In order to refer to the splitting of the preceding LMB, a system implemented by this invention is required to have a separate information storage unit to store the result of splitting the preceding LMB. For example, the processing result may be stored in tabular form as shown in Table 1 below. Table 1 shows splitting information about the preceding block when an image of 720×288 pixels per frame is split into 810 macro blocks (MSBs) of 16×16 pixels.

TABLE 1

| Macro block | Splitting information about preceding block | | | | |
|---|---|---|---|---|---|
| | LMB | MSB1 | MSB2 | MSB3 | MSB4 |
| 1 | 0 | 0 | 0 | 0 | 0 |
| 2 | 0 | 0 | 0 | 0 | 0 |
| ... | | | | | |
| 809 | 1 | 0 | 0 | 0 | 1 |
| 810 | 0 | 0 | 0 | 0 | 0 |

In Table 1, '0' means the preceding LMB has not been split while '1' means it has been split. MSB1-MSB4 denote sub blocks in each LMB, and splitting information about the preceding block described above is updated with the result of processing the current LMB when starting the procedure to determine whether to split the next LMB.

If it is determined whether to split the LMB, then the process proceeds to operation S21 of determining whether to split the resulting MSBs.

In operation S21, a plurality of splitting threshold values are set for sub blocks, and then it is determined whether to split each sub block into smaller sub blocks. Specifically, a plurality of splitting threshold values are set for an 8×8 sub block (MSB) into which the first 16×16 macro block was split in operation S20, and then it is determined whether to split each MSB according to the splitting threshold values.

Here, splitting threshold values of MSBs are set by experiment, like the LMB splitting thresholds. It is also preferable to set two threshold values: a threshold $R_{thu2}$ to determine the possibility of splitting an MSB and a threshold $R_{ths2}$ to determine whether to split an MSB. Since block splitting is performed to ensure the accuracy of estimation, the threshold values may be set based on MAD ratios used in disparity estimation, as in the case of splitting an LMB.

It is more preferable that whether to split an 8×8 MSB (operation S21) is determined by referring to whether the preceding 8×8 MSB has been split, as in the case of LMB splitting. The background and reason for referring to whether the preceding 8×8 MSB has been split are the same as in the case of LMB splitting, so a detailed description thereof will be omitted.

Operation S21 is divided into operations S212 and S213. In operation S212, the possibility of splitting an MSB is determined by deciding whether $R_{madsub2}$ is greater than $R_{thu2}$. Here, $R_{madsub2}$ denotes the ratio of maximum MAD to minimum MAD of a smaller 4×4 sub block (SSB) within the 8×8 MSB. If $R_{madsub2}$ is greater than $R_{thu2}$, in the operation 213, $R_{madsub2}$, $R_{thu2}$, and $R_{ths2}$ are compared with one another to determine whether to split the MSB.

After the threshold values $R_{thu2}$ and $R_{ths2}$ of MSB are set in operation S211, operation S212 is performed to determine if $R_{madsub2}$ is less than $R_{thu2}$. If $R_{madsub2}$ is less than $R_{thu2}$, which means that disparity has been correctly estimated (there is no possibility of splitting the MSB), it is finally decided that the MSB is not to be split.

Conversely, if $R_{madsub2}$ is greater than $R_{thu2}$ in operation S212, which means there is a possibility of splitting the MSB, operation S213 is performed to determine whether to split the MSB. Unlike conventional techniques, the present invention further involves step S213 of determining whether to split the MSB, instead of directly targeting the MSB to split even when it is determined that the MSB has no possibility of being split.

When determining whether to split the MSB in operation S213, first, it is determined in operation S2131 whether $R_{madsub2}$ is between $R_{th2}$ and $R_{ths2}$, which is the threshold value to determine the splitting of MSB. If $R_{madsub2}$ is not between $R_{thu2}$ and $R_{ths2}$, which means $R_{madsub2}$ is greater than $R_{ths2}$, it is determined to split the MSB and the MSB is split into four SSBs. Then, the process proceeds to the operation of determining whether to split the next MSB.

If $R_{madsub2}$ is between $R_{thu2}$ and $R_{ths2}$, which means there is a possibility of splitting the MSB, to ensure accuracy in determination of the splitting possibility, the present invention further includes operation S2132 of determining whether an MSB placed at the same location in the preceding LMB as the current MSB (hereinafter called "preceding MSB") has been split, as in the case of splitting LMBs. Thus, splitting of the MSB currently being processed is determined by referring to whether the preceding MSB has been split.

As described above, the reason for referring to whether the preceding MSB was split becomes evident through operation S213. In particular, it is necessary to refer to splitting of the preceding MSB when the determination of whether to split the MSB currently being processed is ambiguous. That is, if $R_{madsub2}$ is between $R_{thu2}$ and $R_{ths2}$, a minute change in disparity may occur as described in the conventional technique. Since MAD ratio is near a splitting threshold in such an image block, an unambiguous determination of whether to split often cannot be made. If intermediate views are synthesized by splitting or not splitting the image block without referring to the result of processing the preceding block, the intermediate views exhibit flickering. Thus, the present invention ensures a reliable determination of whether to split by referring to whether the preceding MSB has been split.

When $R_{madsub2}$ is between $R_{thu2}$ and $R_{ths2}$, and the determination of whether to split the current MSB is ambiguous, it is determined to split the current MSB if the preceding MSB is found to have been split. If the preceding MSB has not been split, it is determined to not split the current MSB. When $R_{madsub2}$ is between $R_{thu2}$ and $R_{ths2}$ and the current MSB is split without referring to whether the preceding MSB has been split, unnecessary splitting may degrade the quality of intermediate views synthesized after splitting. Thus, unnecessary splitting can be prevented by referring to whether the preceding MSB has been split.

In order to refer to the splitting of the preceding MSB, a system implemented by this invention is required to have a separate information storage unit to store the result of splitting the preceding MSB. For example, the processing result may be stored in tabular form as shown in Table 1 above.

Splitting information about the preceding block described in Table 1 is updated with the result of processing the current MSB when starting the procedure to determine whether to split the next MSB.

If it is determined to split the MSB, the procedure to determine whether to split the MSB is finished by splitting the MSB into four SSBs. Then, the same splitting process proceeds in order to determine whether to split the next LMB.

Figure 3A:
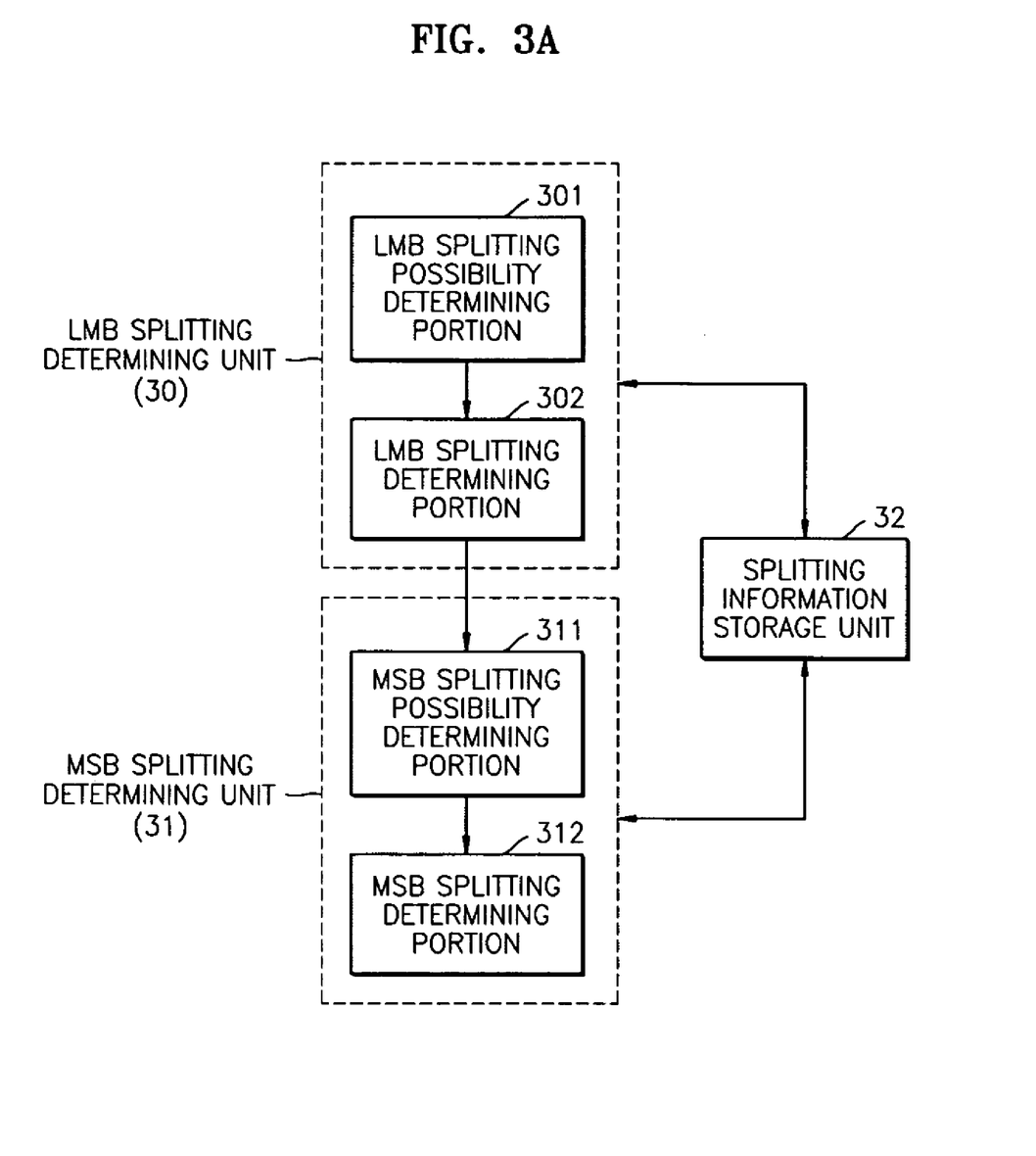
FIG. 3A is a diagram showing a configuration of an image block splitting apparatus according to another embodiment of the present invention.
Figure 3B:
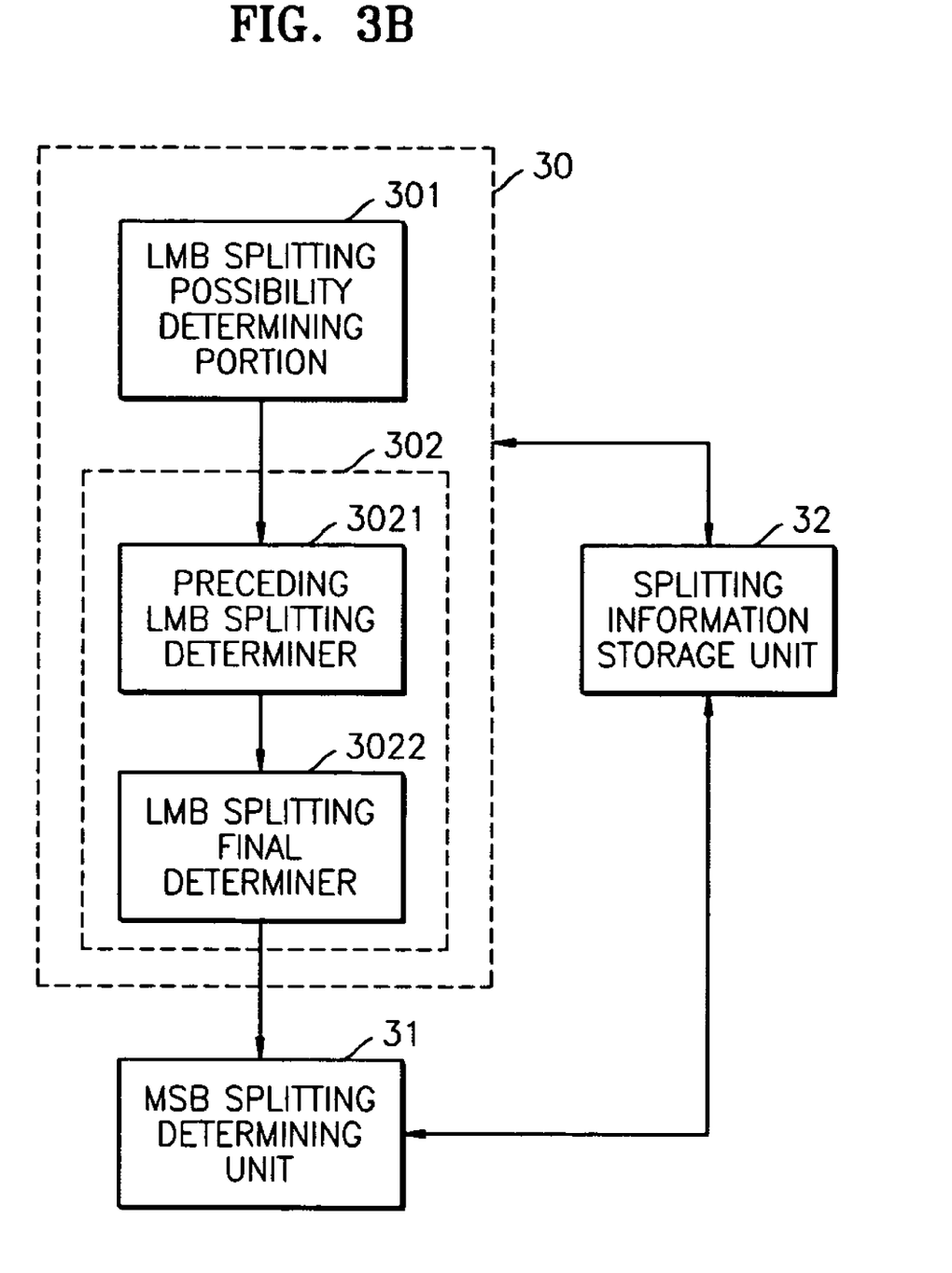
FIG. 3B is a diagram showing the configuration of an LMB splitting determining unit shown in FIG. 3A according to another embodiment of the present invention.
Figure 3C:
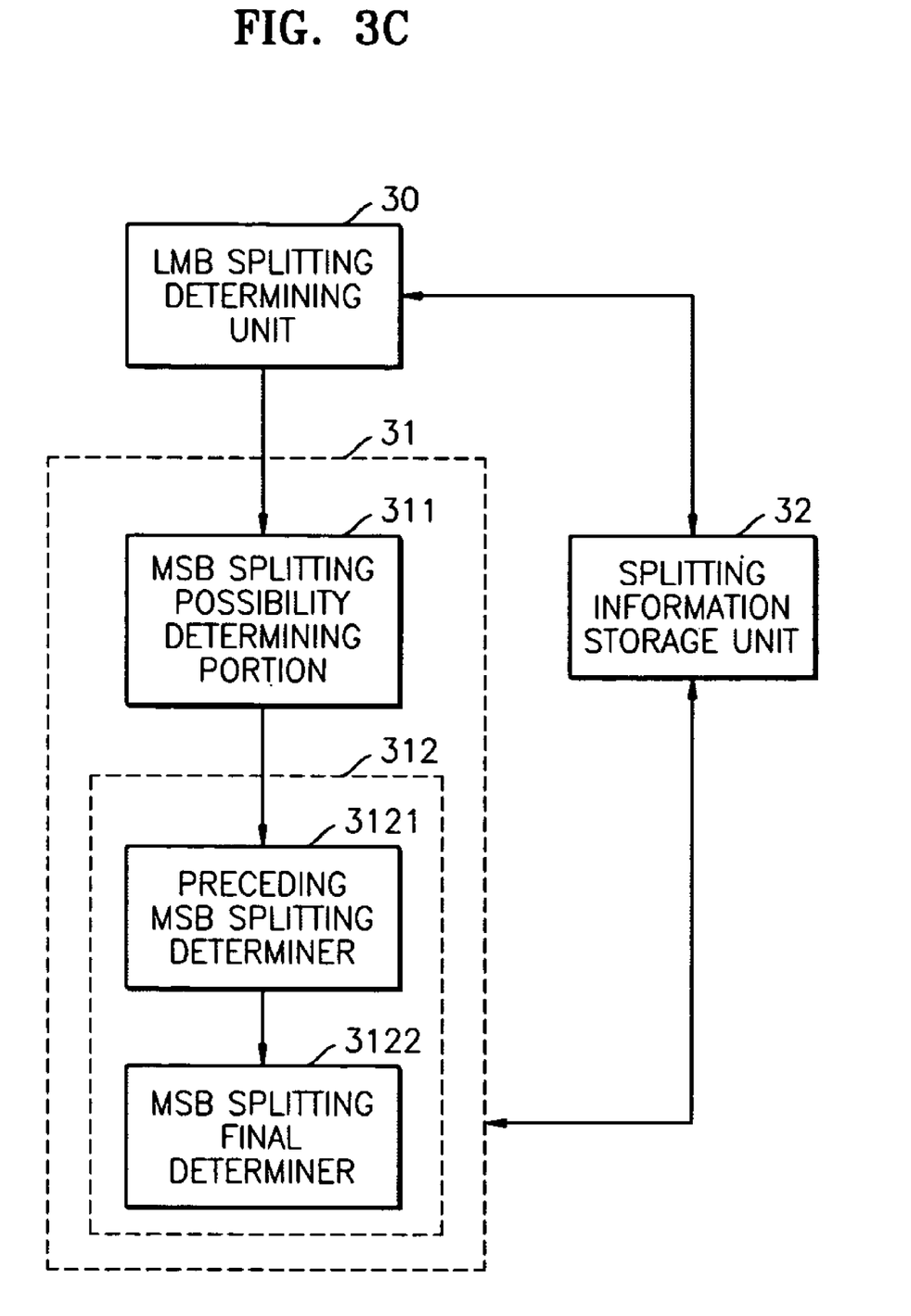
FIG. 3C is a diagram showing the configuration of the MSB splitting determining unit shown in FIG. 3A according to another embodiment of the present invention.

FIG. 3A is a diagram showing the configuration of an image block splitting apparatus according to an embodiment the present invention, FIG. 3B is a diagram showing the configuration of an LMB splitting determining unit shown in FIG. 3A according to another embodiment of the present invention, and FIG. 3C is a diagram showing the configuration of an MSB splitting determining unit shown in FIG. 3A according to another embodiment of the present invention.

An LMB splitting determining unit 30 sets a plurality of splitting threshold values for a first N×N macro block (LMB) to be processed and determines whether to split the LMB according to the splitting threshold values. Hereinafter, it is assumed that N is 16, as is assumed in the above description of the method according to the present invention.

Splitting threshold values are set for a 16×16 LMB by experiment. As in the method according to the present invention, it is preferable to set two threshold values: a threshold value $R_{thu1}$ to determine the possibility of splitting an LMB and a threshold value $R_{ths1}$ to determine whether to split the LMB. Since block splitting is performed to ensure the accuracy of estimation, the threshold values are preferably set based on MAD ratios used in disparity estimation. To maintain consistency with the method of the present invention, MAD ratios calculated when splitting LMB into MSBs and when splitting MSB into SSBs are denoted by $R_{madsub1}$ and $R_{madsub2}$, respectively.

Here, it is more preferable that whether to split the 16×16 LMB is determined by referring to whether the preceding 16×16 LMB has been split. The background and reason for this are the same as in the method of the present invention, so a detailed description thereof will be omitted here.

The LMB splitting determining unit 30 includes of an LMB splitting possibility determining portion 301 and an LMB splitting determining portion 302. The LMB splitting possibility determining portion 301 determines the possibility of splitting LMB by deciding whether $R_{madsub1}$ is greater than $R_{thu1}$. Here, $R_{madsub1}$ denotes the ratio of maximum MAD to minimum MAD of an 8×8 sub block (MSB) within the 16×16 LMB. If $R_{madsub1}$ is greater than $R_{thu1}$, the LMB splitting determining portion 302 compares $R_{madsub1}$, $R_{thu1}$, and $R_{ths1}$ with one another and determines whether to split the LMB.

After the threshold values $R_{thu1}$ and $R_{ths1}$ of the LMB are set, the LMB splitting possibility determining portion 301 determines if $R_{madsub1}$ is less than $R_{thu1}$. If $R_{madsub1}$ is less than $R_{thu1}$, which means that there is no possibility of splitting the LMB, the LMB is not split.

Conversely, if the LMB splitting possibility determining portion 301 determines that $R_{madsub1}$ is greater than $R_{thu1}$, i.e., that there is a possibility of splitting the LMB, the LMB splitting determining portion 302 finally determines whether to split the LMB. First, a preceding LMB splitting determiner 3021 determines whether $R_{madsub1}$ is between $R_{thu1}$ and $R_{ths1}$, which is the threshold value to determine splitting of the LMB, and then determines whether the preceding LMB has been split. If $R_{madsub1}$ is not between $R_{thu1}$ and $R_{ths1}$, which means $R_{madsub1}$ is greater than $R_{ths1}$, an LMB splitting final determiner 3022 finally determines whether to split the LMB.

If the preceding LMB splitting determiner 3021 determines that $R_{madsub1}$ is between $R_{thu1}$ and $R_{ths1}$, the LMB splitting final determiner 3022 finally determines whether to split the LMB being processed by referring to the determination of whether the preceding LMB was split made by the preceding LMB splitting determiner 3021.

As described above, in particular, it is necessary to refer to splitting of the preceding LMB when the determination of whether to split the LMB being processed is ambiguous. That is, if $R_{madsub1}$ is between $R_{thu1}$ and $R_{ths1}$, a minute change in disparity may occur, as described in the conventional technique. Since MAD ratio is near a splitting threshold value in this kind of an image block, an unambiguous determination of whether to split often cannot be made. If intermediate views are synthesized by splitting or not splitting image blocks without referring to whether the preceding block has been split, the intermediate views exhibit flickering. Thus, the present invention ensures a reliable determination of whether to split by referring to whether the preceding LMB has been split.

When $R_{madsub1}$ is between $R_{thu1}$ and $R_{ths1}$, the LMB splitting final determiner 3022 finally determines that the current LMB will be split if the preceding LMB is found to have been split by the preceding LMB splitting determiner 3021. On the other hand, if the preceding LMB has not been split, the LMB splitting final determiner 3022 finally determines the current LMB will not be split. When $R_{madsub1}$ is between $R_{thu1}$ and $R_{ths1}$ and the current LMB is split without referring to whether the preceding LMB has been split, unnecessary splitting may degrade the quality of intermediate views synthesized after splitting. Thus, unnecessary splitting can be prevented by referring to whether the preceding LMB has been split.

In order to refer to the splitting of the preceding LMB, the apparatus of the present invention is required to have a splitting information storage unit 32 to store the result of processing the preceding LMB. For example, the processing result may be stored in tabular form as shown in Table 1 above.

If it is determined whether to split the LMB, then an MSB splitting determining unit 31 determines whether to split resulting MSBs.

The MSB splitting determining unit 31 sets a plurality of MSB splitting threshold values, and then determines whether to split each MSB into smaller sub blocks. Specifically, the MSB splitting determining unit 31 sets a plurality of splitting threshold values for 8×8 MSBs into which the first 16×16 macro block has been split by the LMB splitting determining unit 30, and then determines whether to split each MSB according to the splitting threshold values.

Here, splitting threshold values of the 8×8 MSB are set by experiment, like LMB splitting threshold values. As in the method according to the present invention, it is also preferable to set two threshold values: a threshold value $R_{thu2}$ to determine the possibility of splitting an MSB and a threshold value $R_{ths2}$ to determine whether to split the MSB. Since block splitting is performed to ensure the accuracy of estimation, the MSB splitting thresholds may be set based on MAD ratios as described above.

Here, it is more preferable that whether to split each 8×8 MSB is determined by referring to whether the preceding 8×8 MSB has been split. The background and reason for this are the same as in LMB splitting described above, so a detailed description thereof will be omitted here.

The MSB splitting determining unit 31 includes of an MSB splitting possibility determining portion 311 and an MSB splitting determining portion 311. The MSB splitting possibility determining portion 311 determines the possibility of splitting an MSB by deciding whether $R_{madsub2}$ is greater than $R_{thu2}$. Here, $R_{madsub2}$ denotes the ratio of maximum MAD to minimum MAD of a 4×4 sub block (SSB) within the 8×8 MSB. If $R_{madsub2}$ is greater than $R_{thu2}$, the MSB splitting determining portion 312 compares $R_{madsub2}$, $R_{thu2}$, and $R_{ths2}$ with one another and determines whether to split the MSB.

After the threshold values $R_{thu2}$ and $R_{ths2}$ are set, the MSB splitting possibility determining portion 311 determines if $R_{madsub2}$ is less than $R_{thu2}$. If $R_{madsub2}$ is less than $R_{thu2}$, which means that there is no possibility of splitting the MSB, the MSB is not split.

Conversely, if the MSB splitting possibility determining portion 311 determines that $R_{madsub2}$ is greater than $R_{thu2}$, i.e., that there is a possibility of splitting the MSB, the MSB splitting determining portion 312 finally determines whether to split the MSB. First, a preceding MSB splitting determiner 3121 determines whether $R_{madsub2}$ is between $R_{thu2}$ and $R_{ths2}$, which is the threshold value to determine splitting of an MSB, and then determines whether the preceding MSB has been split. If $R_{madsub2}$ is not between $R_{thu2}$ and $R_{ths2}$, which means $R_{madsub2}$ is greater than $R_{ths2}$, an MSB splitting final determiner 3122 finally determines the splitting of the MSB.

If the preceding MSB splitting determiner 3121 determines that $R_{madsub2}$ is between $R_{thu2}$ and $R_{ths2}$, the MSB splitting final determiner 3122 finally determines whether to split the MSB being processed by referring to the determination of whether the preceding MSB was split by the preceding MSB splitting determiner 3121.

As described above, it is necessary to refer to whether the preceding MSB was split when the initial determination of whether to split the MSB being processed is ambiguous. That is, if $R_{madsub2}$ is between $R_{thu2}$ and $R_{ths2}$, a minute change in disparity may occur as described in the conventional technique. Since MAD ratio is near a splitting threshold in this kind of an image block, a determination of whether to split may be ambiguous. If intermediate views are synthesized by splitting or not splitting image blocks without referring to whether the preceding block has been split, the intermediate views exhibit flickering. Thus, this invention ensures a reliable determination of whether to split by referring to whether the preceding MSB has been split.

When $R_{madsub2}$ is between $R_{thu2}$ and $R_{ths2}$, the MSB splitting final determiner 3122 finally determines that the current MSB will be split if the preceding MSB is found to have been split by the preceding MSB splitting determiner 3121. On the other hand, if the preceding MSB has not been split, the MSB splitting final determiner 3122 finally determines that the current LMB will not be split. When $R_{madsub2}$ is between $R_{thu2}$ and $R_{ths2}$ and the current LMB is split without referring to whether the preceding MSB has been split, unnecessary splitting may degrade the quality of intermediate views synthesized after splitting. Thus, unnecessary splitting can be prevented by referring to whether the preceding MSB has been split.

In order to refer to the splitting of the preceding MSB, the apparatus of the present invention is required to have the splitting information storage unit 32 to store the result of processing the preceding MSB. For example, the processing result may be stored in tabular form as shown in Table 1 above.

Splitting information about the preceding block described in Table 1 is updated with the result of processing the current MSB when starting the procedure to determine whether to split the next LMB.

If the MSB is determined to be split, the procedure to determine whether to split the MSB is finished by splitting the MSB into four SSBs. Then, the same splitting process proceeds in order to determine whether to split the next LMB.

The present invention is advantageous over conventional block splitting techniques in that it can synthesize intermediate views in such a way as to represent a high-equality three dimensional (3D) image, even over a very small change between blocks (frames), by setting two thresholds and using splitting information about a block preceding a block currently being processed.

Embodiments of the present invention can be written in computer-readable code on a computer-readable recording medium. Examples of the computer-readable recording medium include a ROM, a RAM, a CD-ROM, a magnetic tape, a floppy disk, and an optical data storage device. The code may also be transmitted via carrier waves, e.g., over the Internet. Furthermore, the computer-readable code may be stored on and executed from recording media distributed among computer systems connected to one other by a network.

Although the preferred embodiments of the present invention described above refer only to application to intermediate views for 3D image representation and a two-operation splitting procedure (LMB→MSB→SSB), the present invention may be embodied as a splitting procedure containing more than two operations, depending on the size of a macro block, and may be applied to general image processing. Therefore, the described embodiments should be considered not in terms of restriction but in terms of explanation. The scope of the present invention is not limited by the foregoing description but by the following claims, and all differences within the range of equivalents thereof should be interpreted as being covered by the present invention.

What is claimed is:

1. A method of splitting an image block with an image block splitting apparatus, comprising:

setting a plurality of splitting threshold values with a macro block splitting determining unit of the image block splitting apparatus to compare with a characteristic of a macro block in an image frame and determining thereby whether to split the macro block into sub blocks with the macro block splitting determining unit by determining whether the macro block at a same location in a preceding image frame has been split; and setting a plurality of other splitting threshold values with a sub block splitting determining unit of the image block splitting apparatus to compare with a characteristic of each sub block and determining thereby whether to split each sub block into smaller sub blocks.

2. The method of claim 1, wherein the determining of whether to split each sub block into smaller sub blocks is performed by determining whether the sub block at a same location in a preceding image frame has been split.

3. The method of claim 2, wherein the determining of whether to split each sub block into smaller sub blocks comprises:

determining a possibility of splitting the sub block by determining whether a ratio of maximum MAD to minimum MAD of the smaller sub block is greater than a threshold value from among the set other splitting threshold values for determining the possibility of splitting the sub block; and determining whether to split the sub block by determining whether the ratio of maximum MAD to minimum MAD is greater than the threshold value for determining the possibility of splitting the sub block.

4. The method of claim 1, wherein the determining of whether to split the macro block into sub blocks comprises:

determining a possibility of splitting the macro block by determining whether a ratio of maximum mean absolute difference (MAD) to minimum MAD of a sub block in the macro block is greater than a threshold value from among the set splitting threshold values for determining the possibility of splitting the macro block; and determining whether to split the macro block by comparing the threshold value for determining the possibility of splitting the macro block, the ratio of maximum MAD to minimum MAD, and a threshold value for determining whether to spilt the macro block with one another, if the ratio of maximum MAD to minimum MAD is greater than the threshold value for determining the possibility of splitting the macro block.

5. The method of claim 4, wherein the determining of whether to split the macro block comprises:

determining whether the ratio of maximum MAD to minimum MAD is between the threshold value for determining the possibility of splitting the macro block and another threshold value from among the set splitting threshold values for determining whether to split the macro block;

determining whether the macro block at the same location in the preceding image frame has been split if the ratio is between the threshold value and the other threshold value; and determining not to split the macro block if the macro block at the same location in the preceding image frame has not been split, and determining to split the macro block if the macro block at the same location in the preceding image frame has been split and the ratio is between the threshold value and the other threshold value.

6. The method of claim 1, wherein the determining of whether to split each sub block into smaller sub blocks comprises:

determining a possibility of splitting the sub block by determining whether a ratio of maximum MAD to minimum MAD of the smaller sub block is greater than a threshold value from among the other set splitting threshold values for determining the possibility of splitting the sub block; and determining whether to split the sub block by determining whether the ratio of maximum MAD to minimum MAD is greater than the threshold value for determining the possibility of splitting the sub block.

7. The method of claim 6, wherein the determining of whether to split the sub block comprises:

determining whether the ratio of maximum MAD to minimum MAD is between the threshold value for determining the possibility of splitting the sub block and another threshold value from among the other set splitting threshold values for determining whether to split the sub block;

determining whether the sub block at the same location in the preceding image frame has been split if the ratio is between the threshold value and the other threshold value; and determining not to split the sub block if the sub block at the same location in the preceding image frame has not been split, and determining to split the sub block if the sub block at the same location in the preceding image frame has been split and the ratio is between the threshold value and the other threshold value.

8. The method of claim 1, wherein the image frame is a binocular image frame representing a three dimensional image.

9. The method of claim 1, further comprising:
splitting the macro block according to the determining by comparison with the thresholds and the other thresholds whether to split the macro block into sub blocks and into smaller sub blocks using quadtree disparity estimation.

10. A method of splitting an image block with an image block splitting apparatus, comprising:

setting a plurality of macro block splitting threshold values for splitting a macro block in an image frame into sub blocks and determining whether to split the macro block by determining whether a macro block at a same location in a preceding image frame has been split with a macro block splitting determining unit of the image block splitting apparatus; and setting a plurality of sub block splitting threshold values for splitting the sub block into smaller sub blocks and determining whether to split the sub block into smaller sub blocks by determining whether a sub block at a same location in the preceding image frame has been split with a sub block splitting determining unit of the image block splitting apparatus.

11. The method of claim 10, wherein the determining whether to split the macro block by determining whether the macro block has been split in a preceding image frame at the same location comprises:

determining a possibility of splitting the macro block by determining whether a ratio of maximum mean absolute difference (MAD) to minimum MAD of a sub block in the macro block is greater than a threshold value from among the set macro block splitting threshold values for determining the possibility of splitting the macro block;

determining whether the ratio of maximum MAD to minimum MAD is between the threshold value for determining the possibility of splitting the macro block and another threshold value from among the set macro block splitting threshold values for determining whether to split the macro block;

determining whether the macro block at the same location in the preceding image frame has been split if the ratio is between the threshold value and the other threshold value; and determining not to split the macro block if the macro block at the same location in the preceding image frame has not been split, and determining to split the macro block if the macro block at the same location in the preceding image block has been split and the ratio is between the threshold value and the other threshold value.

12. The method of claim 10, wherein determining of whether to split the sub block into smaller sub blocks by determining whether the sub block has been split in a preceding image frame at the same location comprises:

determining a possibility of splitting the sub block by determining whether a ratio of maximum MAD to minimum MAD of the smaller sub block is greater than a threshold value from among the set sub block splitting threshold values for determining the possibility of splitting the sub block;

determining whether the ratio of maximum MAD to minimum MAD is between the threshold value for determining the possibility of splitting the sub block and another threshold value from among the set sub block splitting threshold values for determining whether to split the sub block;

determining whether the sub block at the same location in the preceding image frame has been split if the ratio is between the threshold value and the other threshold value; and determining not to split the sub block if the sub block at the same location in the preceding image frame has not been split, and determining to split the sub block if the sub block at the same location in the preceding image frame has been split.

13. The method claim 10, wherein the image frame is a binocular image frame representing a three dimensional image.

14. The method of claim 10, further comprising:
splitting the macro block according to the determining of whether the macro block and sub blocks at respective same locations in the preceding image frame have been split using quadtree disparity estimation.

15. A computer-readable medium having computer-readable codes recorded thereon that, when executed by a computer, perform a method of splitting an image block, the method comprising:
setting a plurality of splitting threshold values to compare with a characteristic of a macro block in an image frame and determining thereby whether to split the macro block into sub blocks by determining whether the macro block at a same location in a preceding image frame has been split; and
setting a plurality of other splitting threshold values to compare with a characteristic of each sub block and determining thereby whether to split each sub block into smaller sub blocks.

16. The recording medium of claim 15, the program coded method further comprising:
determining whether the sub block at a same location in a preceding image frame has been split.

17. A computer-readable medium having computer-readable codes recorded thereon, that, when executed by a computer, perform a method of splitting an image block, the method comprising:
setting a plurality of macro block splitting threshold values for splitting a macro block in an image frame into sub blocks and determining whether to split the macro block by determining whether the macro block at a same location in a preceding image frame has been split; and
setting a plurality of sub block splitting threshold values for splitting the sub block into smaller sub blocks and determining whether to split the sub block into smaller sub blocks by determining whether the sub block at a same location in the preceding image frame has been split.

18. An apparatus to split an image block, comprising:
a macro block splitting determining unit that sets a plurality of macro block splitting threshold values for splitting a macro block in an image frame into sub blocks and determines therewith whether to split the macro block by determining whether the macro block at a same location in a preceding image frame has been split; and
a sub block splitting determining unit that sets a plurality of sub block splitting threshold values for splitting each sub block into smaller sub blocks and determines therewith whether to split the sub block.

19. The apparatus of claim 18, wherein the macro block splitting determining unit determines whether to split the macro block by determining whether the macro block at a same location in a preceding image frame has been split.

20. The apparatus of claim 18, wherein the sub block splitting determining unit determines whether to split the sub block by determining whether the sub block at a same location in a preceding image frame has been split.

21. The apparatus of claim 18, wherein the macro block splitting determining unit comprises:

a macro block splitting possibility determining portion that determines whether the ratio of maximum mean absolute difference (MAD) to minimum MAD of a sub block in the macro block is greater than a threshold value from among the macro block splitting threshold values for determining the possibility of splitting the macro block; and a macro block splitting determining portion that, if the ratio of maximum MAD to minimum MAD is greater than the threshold value for determining the possibility of splitting the macro block, determines whether to split the macro block by comparing the threshold value for determining the possibility of splitting the macro block, the ratio of maximum MAD to minimum MAD, and a threshold value from among the macro block splitting threshold values for determining whether to split the macro block.

22. The apparatus of claim 21, wherein the macro block splitting determining portion comprises:
a preceding macro block splitting determiner that determines whether the macro block at a same location in a preceding image frame has been split after determining that the ratio of maximum MAD to minimum MAD is between the threshold value for determining the possibility of splitting the macro block and the threshold value for determining whether to split the macro block; and
a macro block splitting final determiner that finally determines not to split the macro block if the macro block at the same location in the preceding image frame has not been split, and determines to split the macro block if the macro block at the same location in the preceding image frame has been split.

23. The apparatus of claim 18, wherein the sub block splitting determining unit comprises:
a sub block splitting possibility determining portion that determines whether the ratio of maximum MAD to minimum MAD of the smaller sub block is greater than a threshold value from among the sub block splitting threshold values for determining the possibility of splitting the sub block; and
a sub block splitting determining portion that, if the ratio of maximum MAD to minimum MAD is greater than the threshold value for determining the possibility of splitting the sub block, determines whether to split the sub block by comparing the threshold value for determining the possibility of splitting the sub block, the ratio of maximum MAD to minimum MAD, and a threshold value from among the sub block splitting threshold values for determining whether to split the sub block.

24. The apparatus of claim 23, wherein the sub block splitting determining portion comprises:
a preceding sub block splitting determiner that determines whether the sub block at a same location in a preceding image frame has been split after determining that the ratio of maximum MAD to minimum MAD is between the threshold value for determining the possibility of splitting the sub block and the threshold value for determining whether to split the sub block; and
a sub block splitting final determiner that finally determines not to split the sub block if the sub block at the same location in the preceding image frame has not been split, and determines to split the sub block if the sub block at the same location in the preceding image frame has been split.

25. The apparatus of claim 18, wherein the image frame is a binocular image frame representing a three dimensional image.

26. The apparatus of claim 18, wherein splitting of the macro block and the sub block is performed using quadtree disparity estimation.

27. An apparatus to split an image block, which comprises:
a macro block splitting determining unit that sets a plurality of macro block splitting threshold values for splitting a macro block in an image frame into sub blocks and determines whether to split the macro block by determining whether the macro block at a same location in a preceding image frame has been split; and
a sub block splitting determining unit that sets a plurality of sub block splitting threshold values for splitting each sub block into smaller sub blocks and determines whether to split each sub block by determining whether the sub block at a same location in the preceding image frame has been split.

28. The apparatus of claim 27, wherein the macro block splitting determining unit comprises:
a macro block splitting possibility determiner that determines whether a ratio of maximum mean absolute difference (MAD) to minimum MAD of the sub block in the macro block is greater than a threshold value from among the set macro block splitting threshold values for determining the possibility of splitting the macro block;
a preceding macro block splitting determiner that determines whether the macro block at the same location in the preceding image frame has been split after determining that the ratio of maximum MAD to minimum MAD is between the threshold value for determining the possibility of splitting the macro block and a threshold value from among the set macro block splitting threshold values for determining whether to split the macro block; and
a macro block splitting final determiner that finally determines not to split the macro block if the macro block at the same location in the preceding image frame has not been split, and determines to split the macro block if the macro block at the same location in the preceding image frame has been split.

29. The apparatus of claim 27, wherein the sub block splitting determining unit comprises:
a sub block splitting possibility determiner that determines whether the ratio of maximum mean absolute difference (MAD) to minimum MAD of the smaller sub block in the sub block is greater than a threshold value from among the sub block splitting threshold values for determining the possibility of splitting the sub block;
a preceding sub block splitting determiner that determines whether the sub block at the same location in the preceding image frame has been split after determining that the ratio of maximum MAD to minimum MAD is between the threshold value for determining the possibility of splitting the sub block and a threshold value from among the sub block splitting threshold values for determining whether to split the sub block; and
a sub block splitting final determiner that finally determines not to split the sub block if the sub block at the same location in the preceding image frame has not been split, and determines to split the sub block if the sub block at the same location in the preceding image frame has been split.

30. The apparatus of claim 27, wherein the image frame is a binocular image frame representing a three dimensional image.

31. The apparatus of claim 27, wherein splitting of the macro block and the sub block is performed using quadtree disparity estimation.

32. The apparatus of claim 27, wherein the macro block splitting determining unit comprises:
a macro block splitting possibility determiner that whether the ratio of maximum mean absolute difference (MAD) to minimum MAD of the sub block in the macro block is greater than a threshold value from among the macro block splitting threshold values for determining the possibility of splitting the macro block.

33. The apparatus of claim 27, wherein the macro block splitting determining unit comprises:
a preceding macro block splitting determiner that determines whether the macro block at a same location in a preceding image frame has been split after determining that the ratio of maximum MAD to minimum MAD is between the threshold value for determining the possibility of splitting the macro block and a threshold value from among the macro block splitting threshold values for determining whether to split the macro block.

34. The apparatus of claim 33, wherein the macro block splitting determining unit comprises:
a macro block splitting final determiner that finally determines not to split the macro block if the macro block at the same location in the preceding image frame has not been split, and determines to split the macro block if the macro block at the same location in the preceding image frame has been split.

35. A method of splitting an image block with an image block splitting apparatus, comprising:
splitting macro image blocks each of left-eye views and right eye views into sub image blocks according to quadtree disparity estimation using a plurality of splitting threshold values and determining not to split the macro block if the macro block at a same location in a preceding image frame has not been split with a macro block splitting determining unit of the image block splitting apparatus; and
splitting each sub block into smaller sub blocks according to the quadtree disparity estimation using a plurality of other splitting threshold values with a sub block splitting determining unit of the image block splitting apparatus.

36. The method of splitting an image block of claim 35, further comprising;
determining not to split the sub block if the sub block at a same location in a preceding image frame has not been split.

* * * * *